United States Patent [19]

Harlan

[11] Patent Number: 5,838,966
[45] Date of Patent: Nov. 17, 1998

[54] COMPUTER-AIDED LITIGATION CONTROL SYSTEM

[75] Inventor: Robert W. Harlan, Coto De Caza, Calif.

[73] Assignee: Computerized Litigation Control Systems, Inc., Laguna Hills, Calif.

[21] Appl. No.: 501,601

[22] Filed: Jul. 12, 1995

[51] Int. Cl.$^6$ .................................................. G06F 17/30
[52] U.S. Cl. .......................... 395/615; 395/611; 395/333
[58] Field of Search .................................. 395/114, 601, 395/611, 612, 613, 614, 615; 364/479.01, 551.01, 413

[56] References Cited

U.S. PATENT DOCUMENTS

| | | | |
|---|---|---|---|
| 4,412,288 | 10/1983 | Herman | 395/413 |
| 5,337,258 | 8/1994 | Dennis | 364/551.01 |
| 5,471,564 | 11/1995 | Dennis et al. | 395/114 |
| 5,550,746 | 8/1996 | Jacobs | 364/479.01 |

Primary Examiner—Thomas G. Black
Assistant Examiner—Ruay Lian Ho
Attorney, Agent, or Firm—Herbert M. Shapiro

[57] ABSTRACT

Data generated and accumulated during a multi-stage proceeding, such as a litigation proceeding, is organized in a matrix of screens according to Section (catagory) and Level for later retrieval. Each screen is accessed by user selection of a point on the matrix and each screen has a pattern of fields at which data can be entered into the system. By imposing a pattern of fields of data entry, codes can be associated with each entry which permit ease of retrieval. Different subsets of the set of fields in the various screens have like codes to encode data entered there and to retrieve there subsets of stored data entered at other fields and having like codes. A data file is established for each case and a matrix is operative in a manner analogous to a template where a field is like an aperture in the template permitting access only to the data at the aperture. Not only is data retrieval simplified but all data is available automatically without the necessity of accessing a number of files as is required of prior art systems.

5 Claims, 14 Drawing Sheets

FIG. 4

21st Century Lawyer

FILE  EDIT  DATABASE  RECORD  TELEPHONE  OTHER

FILE # 1234
NAME   Lipless
CLIENT Lipless

SECTION I
LEVEL A
Facts & Chronology

LEVEL B | LEVEL C | LEVEL D | LEVEL E ( TIMER-ON )

Case Chronology of Facts

| Date | Key Facts | Chronology Group |
|---|---|---|
| 04/02/87 | I.B. Lipless feels a slight lump in his lip and associated cold sore. | General Facts |
| 07/01/87 | Lipless has had sore for 3 months, decides to go to doctor. | General Facts |
| 07/30/87 | Locates Dr. Derm Call and Sch an appointment for mid August. | General Facts |
| 08/18/87 | Lipless 1st visit to Dr. Derm [ treatment w/ prescription medication. ] | Dr. Derm Treatment |
| 09/02/87 | Derm sees Lipless [ visit #2 - does a smear test to I.D. ] | Dr. Derm Treatment |
| 09/09/87 | No Improvement - 3 BB lumps - no herpes - schedules for a biopsy - [ vis | Dr. Derm Treatment |
| 09/15/87 | Visit #4 - Dr. D does a needle biopsy of all three of the BB size last | Dr. Derm Treatment |
| 10/06/87 | Dr. Derm reviews Dr. Path's report w/ Dr. Path  [ rpt. id's Based c | Dr. Derm Treatment |
| 10/08/87 | Dr. Derm meets with Lipless and advise of the path rpt and recommends tr | Dr. Derm Treatment |
| 10/15/87 | Derm does a three hour shave-excision on lipless lower lip. | Dr. Derm Treatment |
| 11/04/87 | #1 visit w/ cellwatcher runs tests and examines lymph system | Dr. Cellwatcher Treatme |
| 11/09/87 | visit#2 patient is told no signs of any spread of the cancer | Dr. Cellwatch Treatment |
| 01/06/88 | Visit for F/U on excision and for derm treat face patient mentions lum | Dr. Derm Treatment |

S1b    Record 3/2B    Record Unlocked    Ins  Num

21st Century Lawyer

FILE  EDIT  DATABASE  RECORD  TELEPHONE  OTHER

FILE # 587888
NAME Jones vs. All City Telephone
CLIENT All City Telephone Company SECTION V
Level A
TRIAL PREPARATION ( TIMER-ON )

NON-EVIDENTIARY

- Pre-Trial Motions
- Opening Statment
- Voir Dire
- Trial Motions
- Exhibit List
- Closing Argument
- Witness List
- Post Trial Motions
- Preparation of Witness
- Misc Trial Preparations
- Trial Calendar Preparation
- Jury Instructions

EVIDENTIARY

- Witness Trial Files
- Demonstrative Evidence
- Non Demonstrative Evidence
- Misc Trial Preparations

FILE # 587888
NAME Jones vs. All City Telephone
CLIENT All City Telephone Company SECTION II
Level B
Plaintiff's Contention Clear | Modify | Delete
Save | Cancel | Browse

TIMER-ON

Plaintiff Witness
Plaintiff Type
Cause of Action: Informed Consent
Factual/Legal Element: Fully informed of the Risk
Chronology Event Contention ID
Related Rebuttal ID
Doc ID
Chronology Dt Plaintiff's Contention Relavant Facts Legal Precedence Facts of Legal Precedence FILE EDIT DATABASE RECORD TELEPHONE Help FILE # 587888
NAME Jones vs. All City Telephone
CLIENT All City Telephone Company SECTION VII
Level A
General Administration

-C-  -E-  TIMER-ON

- Case File
- General Client Information
- Contact At Client Firm
- Conflict Of Interest
- Correspondence
- Representation File
- Case Evaluation

- Law Firms/Case History
- Judge File
- Plaintiff Information
- Defendant Information
- Case Address Book
- ************
- Contract File

- ************
- Misc. Billing
- Authorized Users
- User Billing Rates
- Auto Calendaring/To Do
- Procedural Rules
- Import/Export Operations Ins  Num

FIG. 9

FILE EDIT DATABASE RECORD TELEPHONE Help

FILE # 587888
NAME Jones vs. All City Telephone
CLIENT All City Telephone Company SECTION IV
Level A
Case Development

-C-  -E-  TIMER-ON

*Please Choose One of The Options Below...*

- Investigations
- Interviews
- Records/Documents
- Interrogatories
- Request For Admission

- Depositions
- Medical Exam
- Expert Review
- Non-Legal Research
- Demonstrative Evidence

- Pleadings
- Motions
- Legal Research
- Trial Preparation
- Miscellaneous

Ins  Num

FIG. 10

COMPUTER-AIDED LITIGATION CONTROL SYSTEM

FIELD OF THE INVENTION

This invention relates to a computer-aided system for organizing and displaying data stored by a legal professional and relating to a designated case where the data is later required for action in a sequence of stages characteristic of a litigation proceedings.

BACKGROUND OF THE INVENTION

During a litigation procedure, a vast amount of data is accumulated. This data is related to the various issues involved such as the witnesses, the parties, the facts, interrogatories, summaries, status, calendar . . . etc. The plague of the attorney is that all the facts rarely seem to be available when later needed. That is to say, previously-filed data is accumulated and stored in various files, but is not readily available without a considerable expenditure of time to locate all the relevant facts related to an action which must be taken. Even more time is lost because the attorney often has not identified all the facts which he may require until he is fully engaged in the action.

BRIEF DESCRIPTION OF THE INVENTION

This invention is based on the recognition that most of the time spent by a legal professional looking for information in a litigation procedure could be avoided if the various data accumulated during such a procedure were organized in a matrix of categories and levels of actions. The invention also is based on the recognition that a computer can be made to operate to store information essentially redundantly by establishing a set of forms or screens which provide to a user a visual indication of fields into which data are stored. By permitting data storage only in such fields and by encoding the data so stored with access permission codes which also permit access to the stored data via any one of a related set of fields in other screens, later access to previously-stored data in response to user selection is simplified. Thus, in accordance with the principles of this invention, a computer provides a plurality of interrelated screens organized in a matrix of categories and levels, each screen having a pattern of fields where a user can only enter data in a field and where the entry of data in a field automatically associates a code with the data which permits access to the data via any one of a set of related fields in the various screens.

All data associated with a given case is stored in a single data file for that case. Any subset of stored data for a selected case is available automatically via the selection of a section and level in the matrix which corresponds to the selected case rather than accessing a plurality of files each of which contains like data for a number of different cases as, for example, addresses. The system of access is analogous to a template which overlies the data file where a related pattern of fields in the set of screens is analogous to the openings in the template.

The computer responds to the selection of a case by a user to provide a matrix of catagories and levels corresponding only to the selected case data file. Thus, related subsets of stored case data are available only via fields defined in a set of screens with fields accessable by computer in response to user selection where the screens are organized to provide a visual indication of the consecutive stages of a litigation proceeding.

Applicant believes that the use of a matrix of categories (sections) and levels relating to a single case and the set of screens, each corresponding to a selected section and level of the matrix represents a significant departure from prior art data retrieval systems and facilitates access to all stored data related to a selected screen and field at a later point in the litigation.

BRIEF DESCRIPTION OF THE DRAWINGS

FIGS. 4 through 10 are views of representative screens accessed via the Matrix of FIG. 3 illustrating patterns of fields therein for storing data and for accessing accessing previously stored case related data.

DETAILED DESCRIPTION OF AN ILLUSTRATIVE EMBODIMENT OF THE INVENTION

Figure 1:
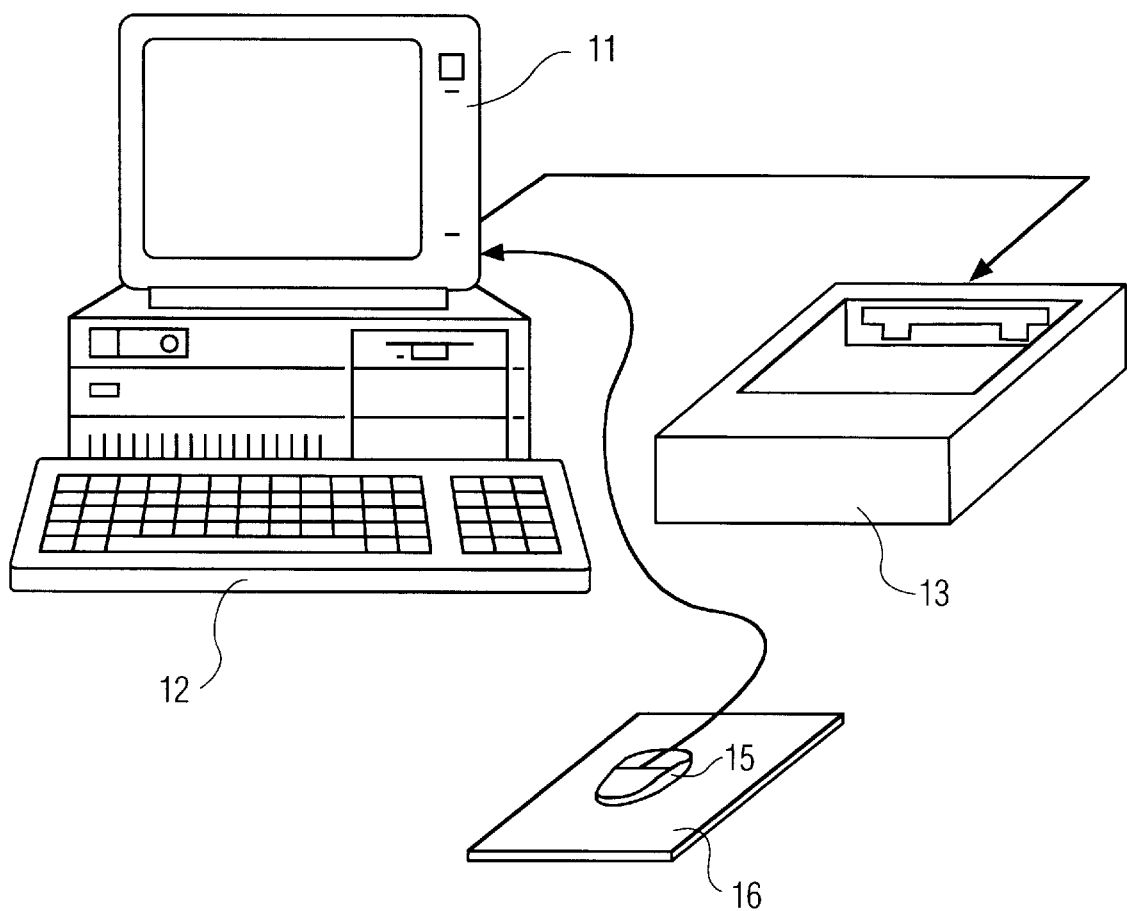
FIG. 1 is a schematic block diagram of a computer for storing and displaying client data according to a Matrix of Sections and Levels in accordance with the principles of this invention.

FIG. 1 shows a computer useful for practicing the invention. The computer may be any IBM compatable personal computer. The computer includes a monitor 11 and a key board 12 and is connected to a printer 13. The computer also includes a mouse 15 shown on pad 16.

Figure 2:
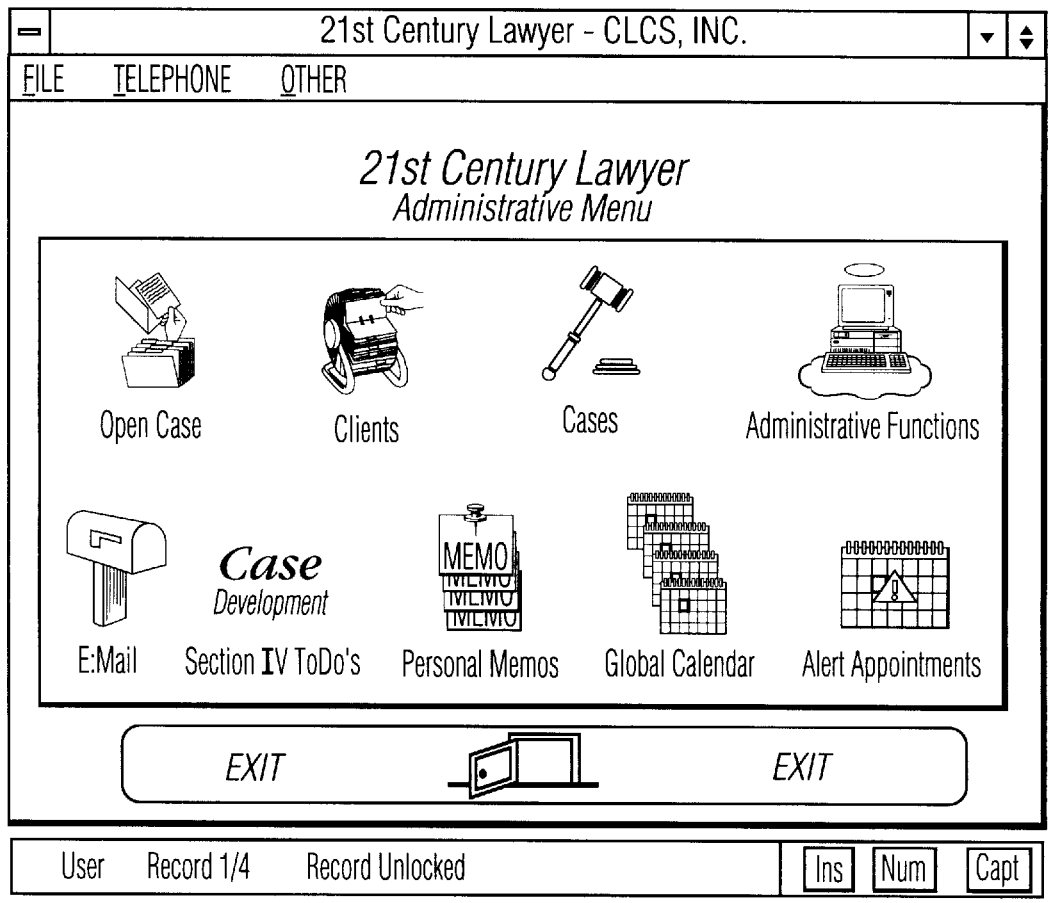
FIG. 2 is a view of an Administrative Menu screen for selecting a case represented by a Matrix accessed by the computer of FIG. 1.

FIG. 2 shows an Administrative Menu screen which appears on monitor 11 when a user logs onto the system. The Administrative Menu allows the user to perform typical, non-file specific activities such as telephone calls, E-mail, monitoring file assignments, reviewing and editing the calendar, accessing a personal memo pad, etc. Such activities are familiar activities to computer users and are incorporated into the illustrative litigation control system herein.

Figure 3:
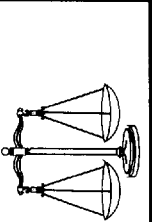
FIG. 3 is an illustrative Matrix of Sections and Levels for a case for user access to screens for storing and retrieving data relating to a selected case.

A user next selects an "Open File" icon with mouse 15. The selection of a file results in the appearance of the Main Matrix for that file. The Main Matrix for a file is shown in FIG. 3. The Main Matrix for a file comprises seven (vertical) Sections and five (horizontal) Levels, any Section and Level in which can be reached by drag and click of mouse 15.

The Sections of the Main Matrix, from top tp bottom, as viewed in FIG. 3, are: 1. Facts and Chronology; 2. Legal Issues and Witnesses; 3. Damages Evaluation; 4. Case Development (to do's); 5. Trial Management; 6. Case Calendar; and 7. Case Management and Reporting. The five levels are: Level A—Menu Catagory; Level B—Summary of Data; Level C—Linking to Original Documents; Level D—Attorney Work Product; and Level E—Time Tracking and Budget.

FIGS. 4 through 10 show examples of the use of the Main Matrix. The figures show the screens for Section 1, Level A; for Section 4, Level C; for Section 1, Level E; for Section 5, Level A; for Section 2, Level B; for Section 7, Level A; for Section 4, Level A; and for Section 4, Level D respectively. FIG. 4, specifically, shows the screen for Chronology. Case events are shown in the screen—actual dates and key facts. Events can be sub-characterized, and each event can be searched. Details of events can be seen by clicking on the word "Memo".

Figure 5:
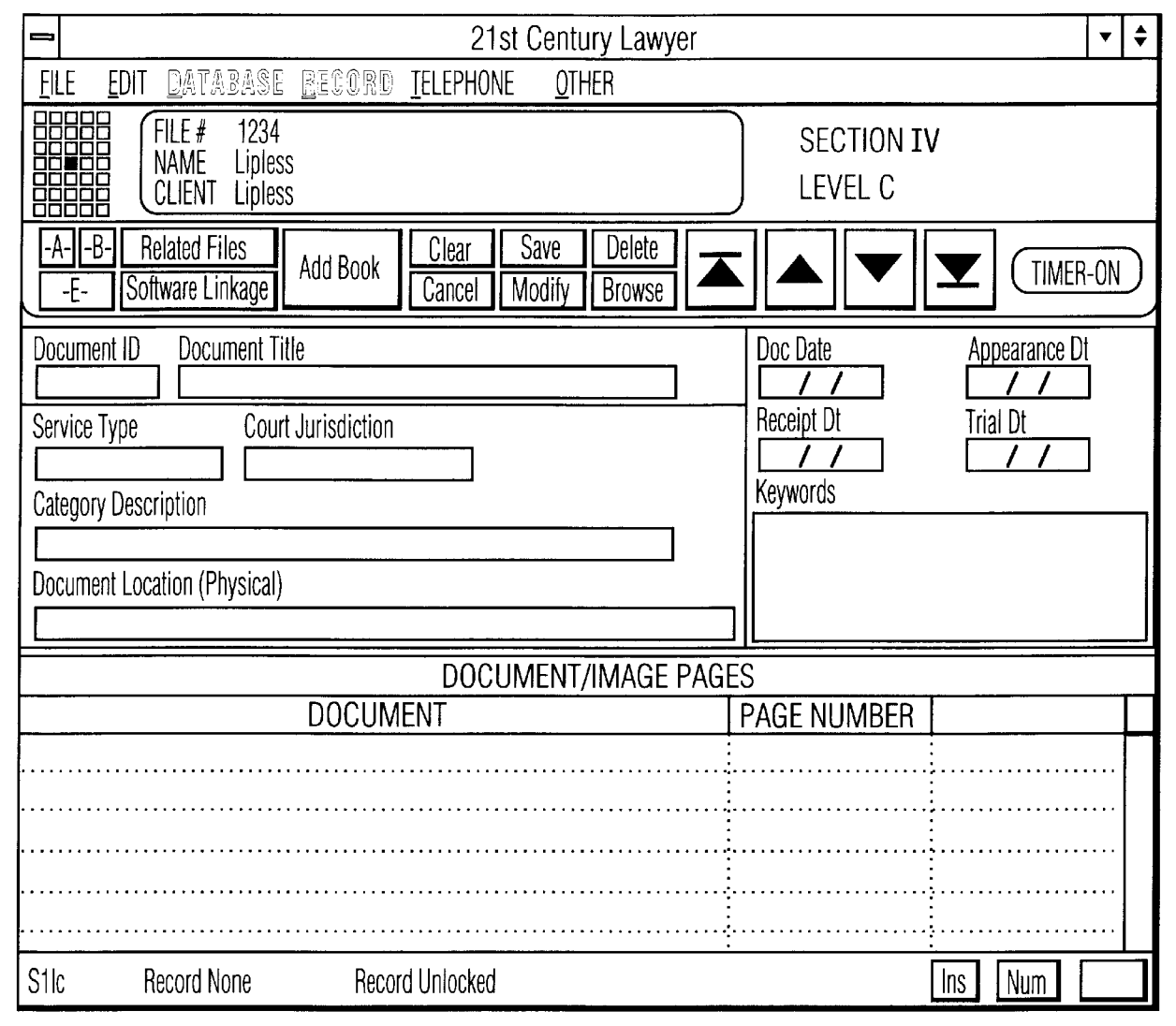

FIG. 5 shows the screen for Section 4, Level C. The screen provides links to other software. This is the original document control area. From this screen, a user can click on the Software Linkage button to run a desired software or bring up a particular document. Automatic calendar entries and setting up of things to do are controlled here, based on the input of the field chosen for entry of data. Documents can be linked to Witnesses and Things To Do by using the related File buttons.

Each screen corresponding to a Section and Level of the Matrix of FIG. 3 herein includes a plurality of fields each of which is labelled and provides a space at which data can be entered into the system. Data is entered into the system only in a field and data so stored is entered with a code for the field at which the data is stored.

Figure 6:
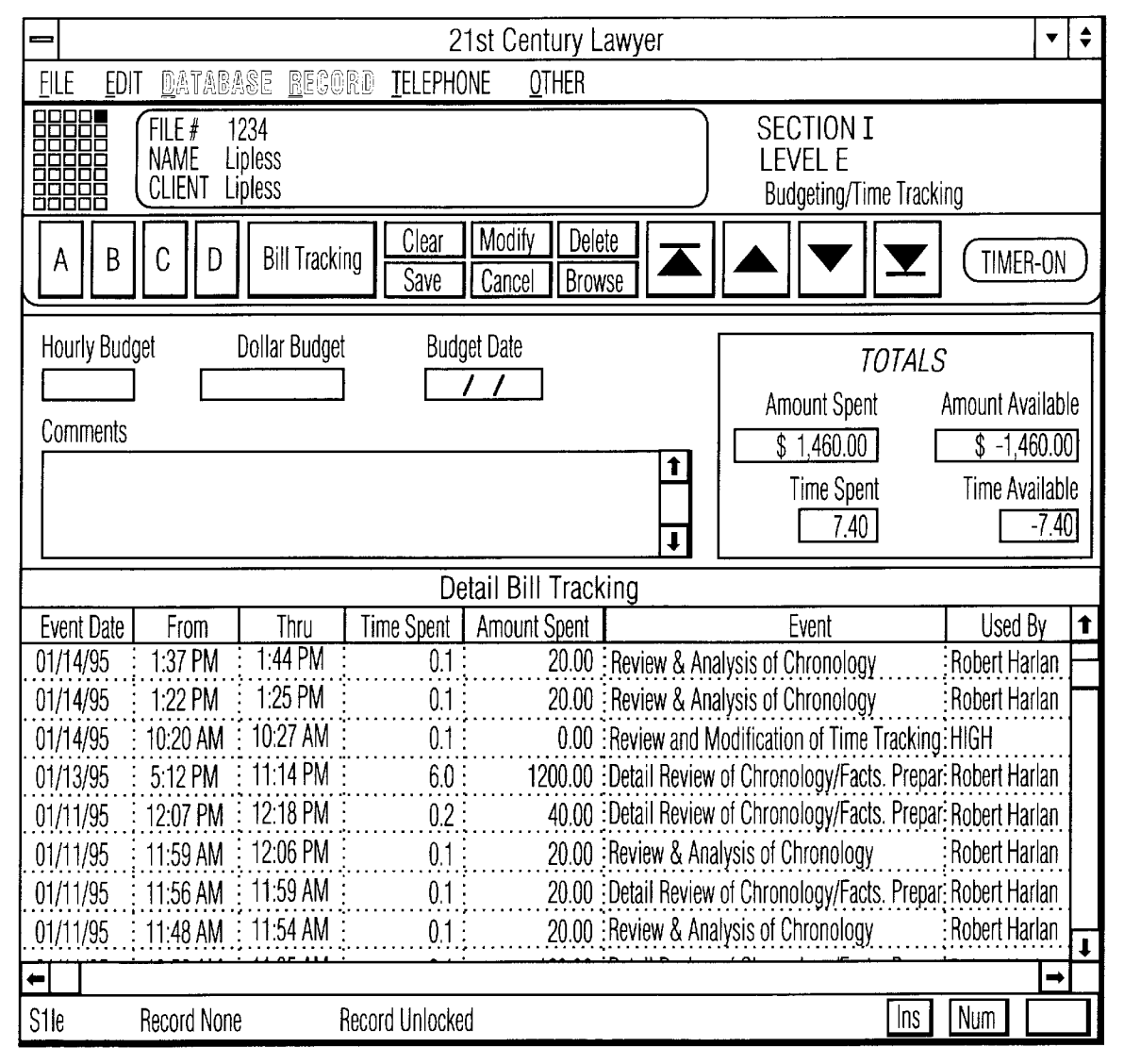

FIG. 6 shows the screen for Section 1, Level E of the Matrix of FIG. 3. This screen controls Time Tracking and Budgeting. It shows the exact time and amount billed based on user's billing rate and event performed. The user can adjust or justify the time in greater detail. The upper area of the screen is the budgeting area where items can be budgeted by hours, dollars or both. The TOTAL box shows the actual cost in comparison to the budget at any given point.

FIG. 7 shows the screen for Section 5 (or V), Level 1—the Trial Preparation Screen. This screen provides access to all the different trial preparation activities. The witness trial files are an accumulation of data entered in Section 2 as is the witness listing. A unique feature is the TRIAL CALENDAR PREPARATION where the user can outline the course of the trial (VOIR DIRE, opening statement, order of witnesses, etc.) in a calendar format without cluttering the main calendars.

Access to previously stored data via the Trial Preparation screen represents one important example of the improvement in data availability, in accordance with the principles of this invention. The improvement is achieved by automatically encoding data with a code related to the field in which it is stored, as mentioned above, and by having the code also related to a subset of the totality of fields in the screens of the system at which the data may later be useful. Access to data via any field in the set of screens in the Matrix of FIG. 3 provides an access key for the now-accessing field for comparison with the code for the field at which the data was originally stored to determine if the now-accessing field is in a subset for which access to the data is permitted. Since all data, represented by the Matrix of the selected case file, corresponds to only a single case, all data is available without accessing another file. Thus, the code attached to data input at a given field permits access to that data via any field with a related code. The accessing system is analogous to a pair of plastic disks which are rotatable with respect to one another where one of the disks has a pattern of holes to provide visual access to related data amongst a greater number of data printed on the adjacent disk. By like-encoding of related fields herein and by requiring data entry only at fields and by encoding the data with the code of the entry field, other fields, with related codes, function as do the windows of the disks to permit visual access to related data of the totality of data stored.

FIG. 8 shows the screen for Section 2 (or II), Level B of the Matrix of FIG. 3. This is the screen for Contentions and is where the case is developed, linking the witnesses, the causes of action, elements, chronology of relevant facts, and documents to improve the case. All the fields in the screen are searchable. For example, the user can look for all the contentions being addressed by a certain witness, etc. Here too, access to previously stored data is much improved in accordance with the principles of this invention.

FIG. 9 shows the screen for Section 7 (or VII), Level A, the File Administration screen. The screen presents a group of general administrative type of activities to a user, such as reporting to a client, conflict of interest checking, notes on judges and opposing counsel, case address book, users authorized to work on the case (file), billing rates per file, etc.

FIG. 10 shows the screen for Section 4 (or IV), Level A which covers Discovery Activities. The user can set up projects and assignment due dates can be posted to the calendar by a click of the mouse. Assignments are placed automatically in the assignees Case Development in the Administrative Menu.

Figure 11:
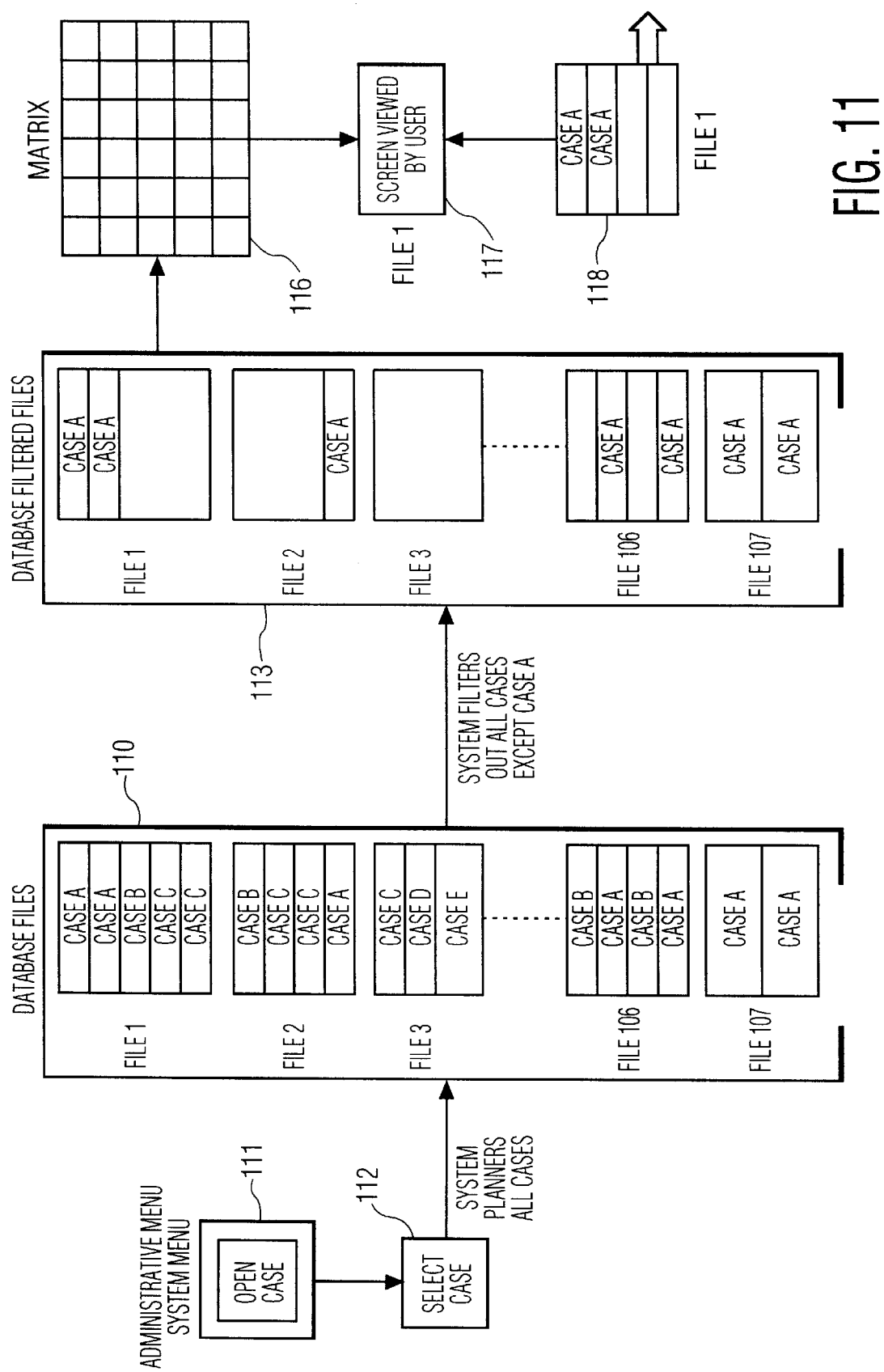
FIGS. 11 through 14 are block diagrams of file structures and access arrangements for illustratative ones of the screens of FIGS. 4 through 10.

FIG. 11 shows the screen for Section 4 (or IV), Level D of the Matrix of FIG. 3. This screen relates to Assignment/Attorney Work Product. The assignments are shown at the top of the screen. The lower half of the screen provides fields for the actual work input. The user can change the status of an assignment (in progress, completed, etc.) and link notes to actual documents.

The figures (4 through 10) are only representative of all the screens shown in the Matrix of FIG. 3. The entire system is available commercially and is entitled the "21st Century Lawyer"™ from Computer Litigation Control Systems, Inc., 25431 Cabot Road, Suite 111, Laguna Hills, Calif. 92653. The Computer requirements for the system are MS-DOS 3.3 or higher; Windows 3.1 or higher; Intel 486 IBM PC or compatible, 33 MHZ or higher (66 MHZ recommended); 12 MB RAM (16 MB recommended); 18 MB of free hard disk space for program; VGA or super VGA display; and a mouse or compatable pointing device. The program for the software system was written in "FoxPro" (a trademark of the Microsoft Corporation).

A user opens a case or file by accessing the Administrative Menu of FIG. 2. At this point, the user has several options to select from: 1. Upon clicking on an icon, the user now has the capability of selecting a case from a browse table. The system responds by opening a database table to list out all available files (cases). 2. Upon selection of a case, the system records the file number (each case has a unique file number) and stores the number in memory. 3. After the selection of a case, all menu options that lead to a screen will reflect data which pertains only to the selected case. This is accomplished by matching the file number, which also is in memory, to the file number which is stored when a record is saved. 4. Upon the selection of a case, the Matrix of FIG. 3 for the selected case appears on the monitor. The Matrix is simply a menu selection organized in Sections and Levels to reflect actions in a multistage proceedings. The Matrix does not hold data. It is only an organizational vehicle to direct a user to areas which do actually store data pertaining to a selected case. Once in a Matrix, a user no longer has to worry obtaining a correct record when a menu option (button) is selected. A correct record is provided automatically, thus eliminating redundant searching in all screens.

An example of the automatic feature is provided by a consideration of Section I, Level A—(Facts and Chronology) as shown in FIG. 4. The system accesses the screen of FIG. 4 by a selection from the Matrix of FIG. 3. The Chronology screen appears on the monitor and the associated database is accessed. Once a database (file) is opened, the system displays only records pertaining to the selected case, filtering out all records pertaining to other cases. The restricted access to a single case is accomplished by matching the memory file number to the file number stored in the database file. The user sees only the chronology information relating to the selected case.

An example to access to plaintiff and defendant data is discussed in connection with Sections 2, 5, and 7 of the Matrix of FIG. 3. When a user enters data pertaining to a plaintiff in a field of a screen of Section 2, the data is stored in a database file and can be accessed also via fields in the screens of Sections 5 and 7. Access is permitted, in such cases, by permitting access to the very same database in which the data was originally stored, that database being linked to other files in Sections 5 and 7. For example, in Section 2, plaintiff data is linked to Contentions (which are stored in another database file). In Section 5, plaintiff data is linked to Trial data (which also is stored in another database file). In Section 7, only plaintiff data is shown. In Section 2, 5, and 7, plaintiff data is the only redundant data (name, address, telephone number, etc.). Instead of having the user re-enter all this data, the data is kept in one database file and access to that data is permitted from several screens such as Contentions (Section 2) and Trial Info. (Section 5).

All these files are linked by plaintiff name. That is to say, if a user is in Section 2 and brings up a record pertaining to "John Doe", the system checks in the Contention file to see if John Doe exists. If he does, then a match is found and the record is available for viewing.

Thus, by organizing a Matrix and a set of screens for each case where each screen has a characteristic pattern of fields, and by permitting data entry only at a field, and by permitting access to data, so entered, by a coded subset of the totality of fields in the screens of the Matrix for the case, storage and retrieval of data for multistage proceedings, such as a litigation proceedings, is organized efficiently so that data is available during later stages in the proceedings.

Manuals for the operation of the system have been supplied to users of the system and such a manual is incorporated herein by reference.

The access structure for a case involved in a litigation proceedings is now discussed; The system maintains one hundred and seven database files. All data for all cases are stored in those files. Once a case has been selected, a user can access various data pertaining to the case without specifically choosing the case again even though the data is stored in the one hundred and seven database files. In response to the selection of a case the system filters out the data pertaining to all other cases and the system thereafter is operative as if all data pertaining to a selected case were stored in a single database file. This is in contradistinction with prior art systems which require an indication of the case to be accessed at each database file level to obtain data.

The case access structure is shown in FIG. 11. Specifically, FIG. 11 shows a set of 107 database files represented by block 110. Case A, B, C, D, . . . N are shown contained within block 110. Entry into the system is via the Administrative Menu/System Menu to open a case as indicated by block 112. Case A is selected and only data related to case A is accessable thereafter as shown by block 113. A Matrix now appears on the monitor as indicated by block 116. When the user selects a case file by cilcking on a cross point of the Matrix, a selected screen appears on the monitor and case A-related data from block 113 is available as, for example, data in file 1 as indicated for blocks 117 and 118 in FIG. 11.

Records in Level C of all Sections of a Matrix can be accessed when in Section 5 and 7. All Level C data is stored in one database file. Records pertaining to the Section the user is in are shown although the data for all Sections exist in the very same file. Once again, this is accomplished by filtering out records pertaining to other Sections and other cases. The records for Sections 5 and 7 are not filtered out. Thus, all records from Sections 1–7 (except for Section 6 which does not have a Level C) are accessible.

Figure 12:
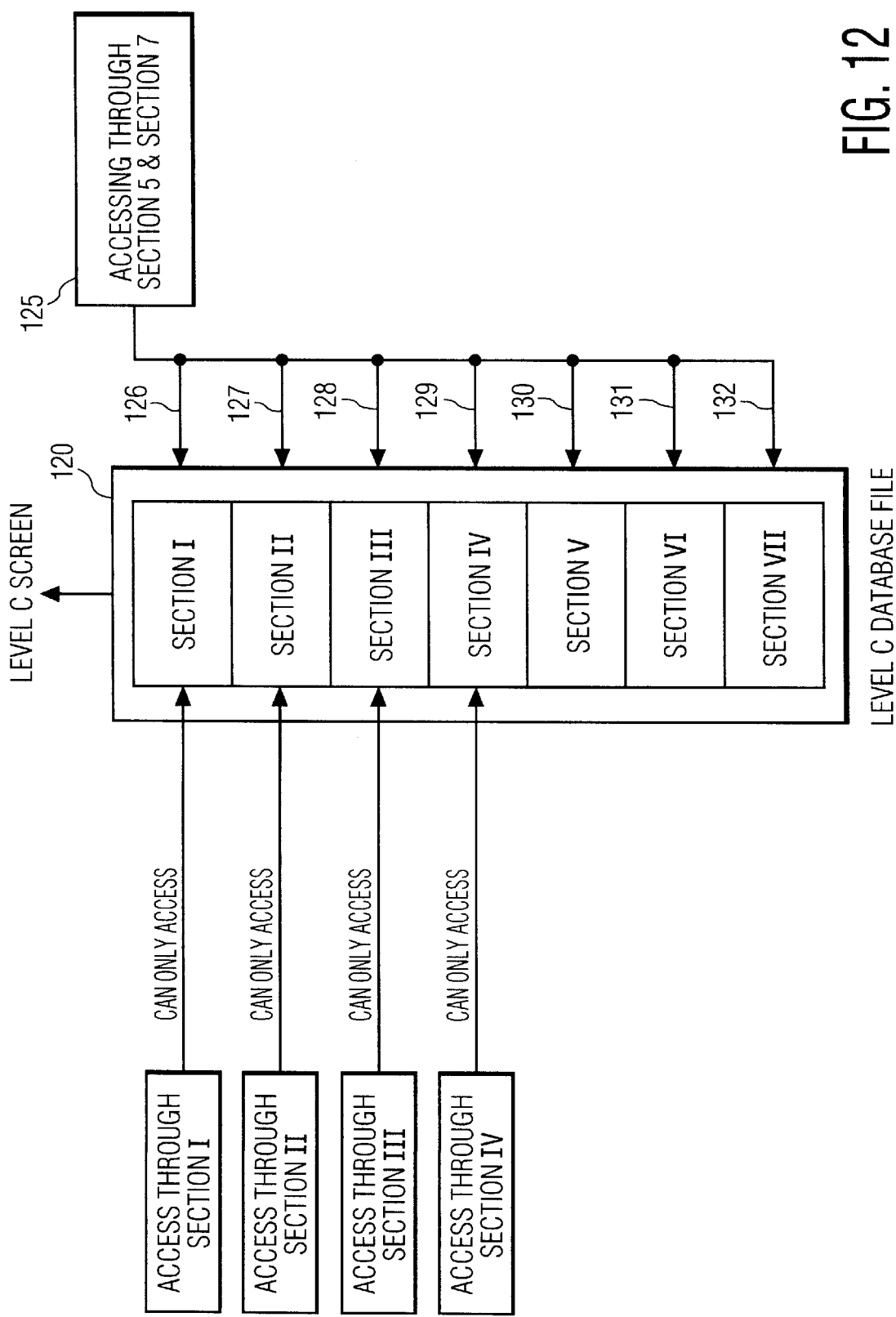

The accessing of records in the system is organized as shown in FIG. 12. The Level C database file is represented by block 120 in FIG. 12. The file is divided into seven Sections, Section 1, Section 11, Section 111, Section 1V . . . Section V11. Access from any screen in Sections 1–1V of the Matrix of FIG. 3 is permitted only to correspondingly designated Sections of the Level C database file. All other data is filtered out. Access through any screen corresponding to Sections 5 and 7 of the matrix, on the other hand, is to data in all Sections of the Level C database file as indicated by block 125 and arrows 126, 127, . . . 132.

The system also permits the access of data pertaining to a document at Level C where the document is stored in another software. This is accomplished from the Administrative Menu. The system administrator has the option of defining other software that can be linked to the system by defining the name of the software and the location of the software in the system. Once done, the user in Level C—External Software Linkage screen can access other software by selecting the software and clicking the "Run Ext Software" button. The system operates to execute the parameter set by the system administrator and by executing the external software.

Figure 13:
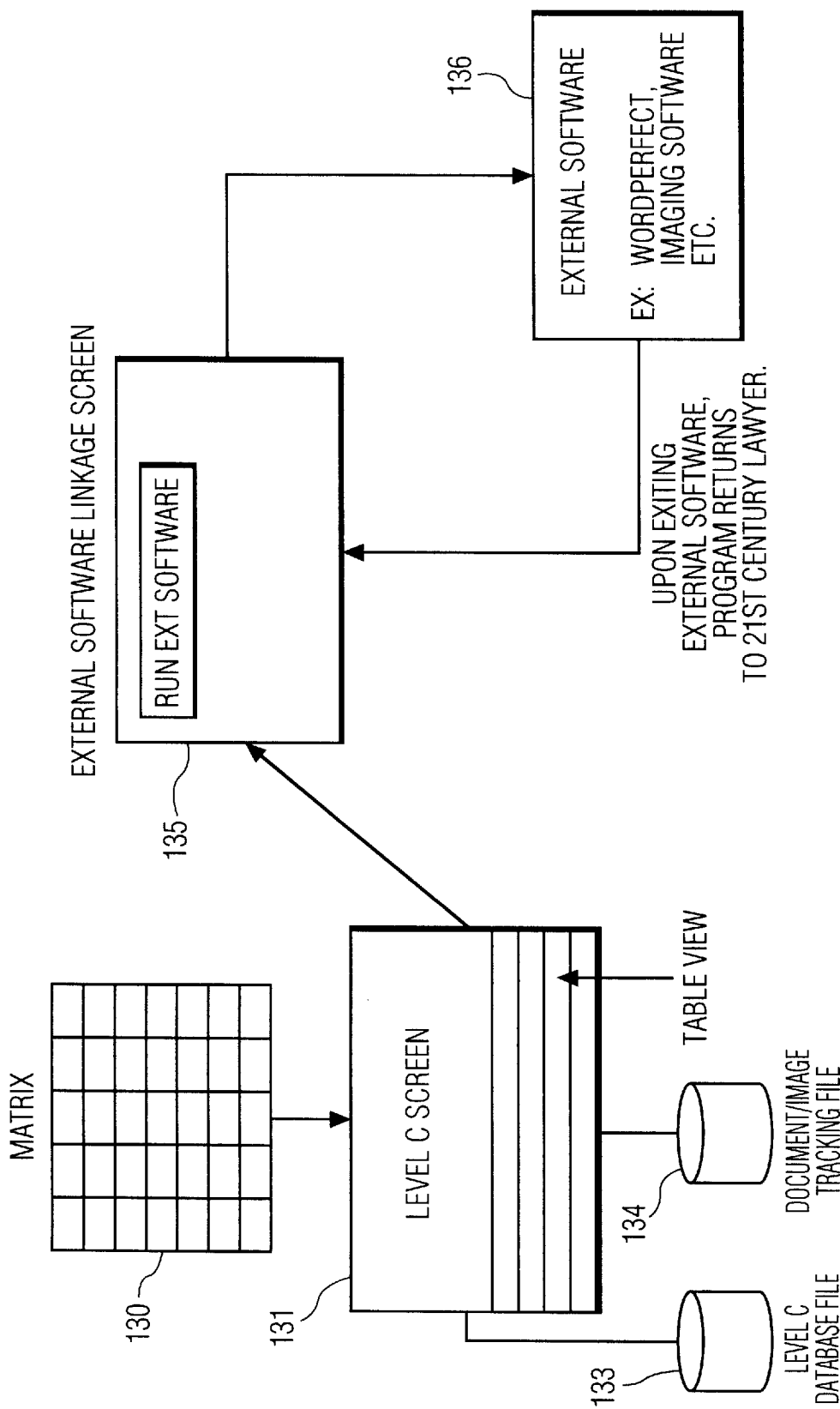

The Level C external software linkage organization is shown in FIG. 13. Specifically, the Matrix, in this instance, is shown as block 130. The selection of the Level C screen from the Matrix is represented by block 131. The Level C database file and a Document/Image Tracking file of the Level C screen are represented by blocks 133 and 134. The selection of the "Run Ext Software" field of the level C screen (block 135) permits the running of external software as indicated by block 136. Exiting the external software returns operation to the original system.

The Level E database file structure and time tracking data are filed in one physical database file (data for all cases). That is to say, although a user views all Sections of Level E as separate, all data are actually stored in one file. But the user has access to the Level E data of only the Section of the Matrix actually selected. Data from all other Sections are filtered out. When a user accesses the screen with the "TIMER" on, the system automatically enters a record in the corresponding Section upon exit from the screen. In this manner, access to a screen is tracked at all times.

When a user uses Level C of a Section of a Matrix to enter an incoming document, etc., the criteria for entry are checked with reference criteria stored in Section 7—To Do/or Calendar the event for the file.

Figure 14:
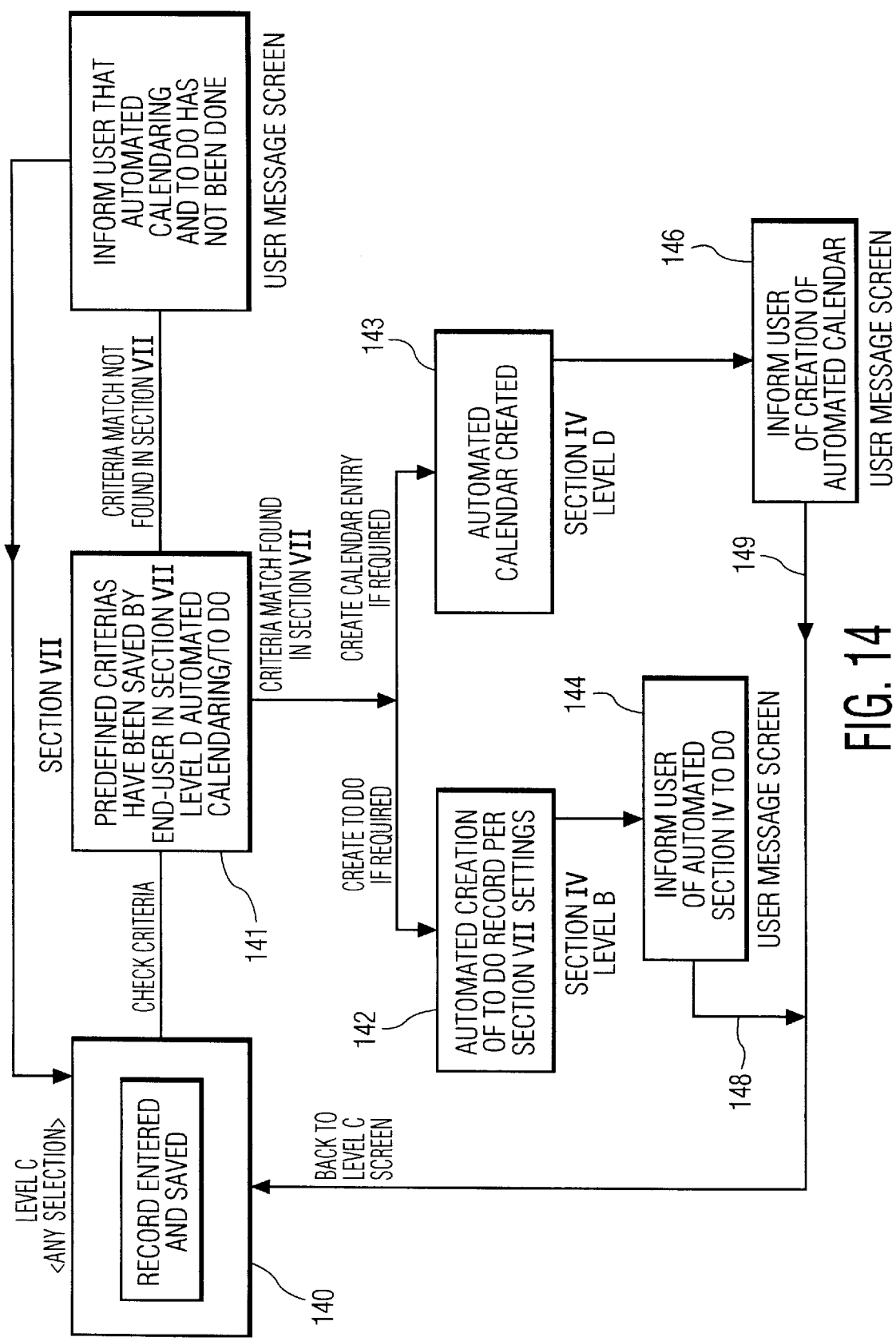

FIG. 14 shows the organization of the system for entering a document. Specifically, block 140 indicates the entry of a record in Level C of any Section of the Matrix. The storage of predefined criteria for document storage resides in Section C, Level D as represented by block 141. If a match occurs, a "To Do" is set as indicated by block 142. If a calendar entry is required, it is created as indicated by block 143. The user is notified of a "To Do" as indicated by block 144 and of a calendar event as indicated by block 146 after either of which the system returns to the Level C screen as indicated by arrows 148 and 149.

The invention has been described in the context of an illustrative Litigation Control System in various portions of which data retrieval is simplified in accordance with the principles of this invention. The illustrative system is presently available commercially and a full description thereof is not rendered herein as unecessary for an understanding of the invention.

What is claimed is:

1. A computer aided litigation control system, said system including a computer, said computer including a data file for each case, said computer also including a matrix of sections and levels of activities undertaken in a litigation proceedings for organizing the storage and retrieval of data stored in said data file, said computer also including a plurality of screens each of which corresponds to a different point in said matrix and being accessed by a user selecting a point in said matrix, each of said screens including a pattern of fields each having a designated activity associated with it for prompting a user, said system permitting data entry only via a selected field and associating with said data a code for later retrieval of said data, subsets of said fields having like codes associated therewith for permitting later access only to subsets of data previously stored in said data file and having like codes associated therewith.

2. A system as in claim 1 wherein like data for all cases are stored in each of a plurality of database files and said system is operative to filter out all data except data associated with a selected case therefrom.

3. A system as in claim 2 wherein said plurality of database files comprises one hundred and seven database files.

4. A system as in claim 1 wherein like data for all cases are stored in each of a plurality of database files and said system is operative to filter out all data except data associated with a selected case therefrom.

5. A system as in claim 4 wherein said plurality of database files comprises one hundred and seven database files.

* * * * *